Patented Feb. 1, 1938

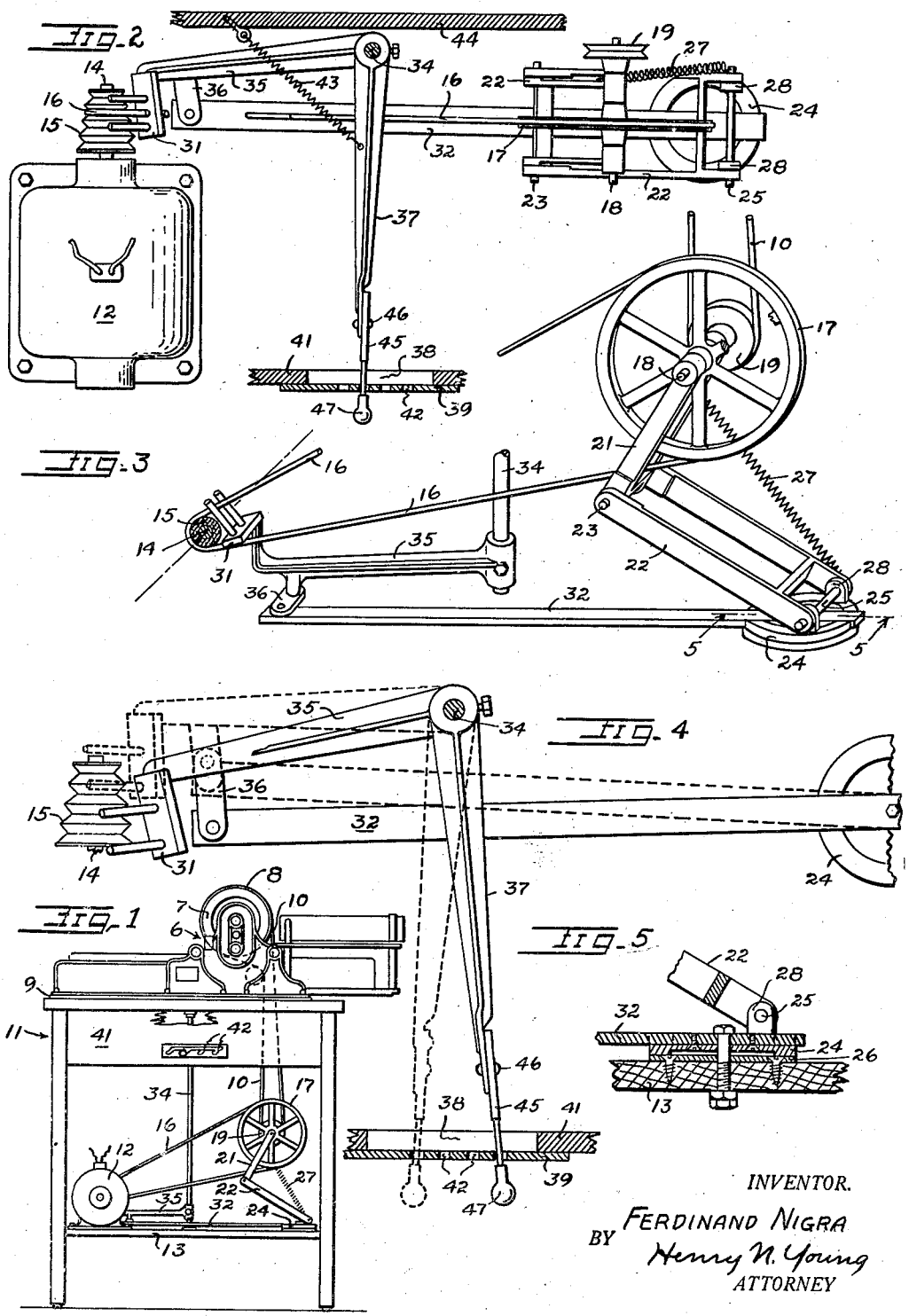

2,106,930

UNITED STATES PATENT OFFICE 2,106,930

VARIABLE SPEED BELT DRIVE

Ferdinand Nigra, San Francisco, Calif., assignor to Nigra Duplicator Company, San Francisco, Calif., a corporation of California Application September 30, 1935, Serial No. 42,850

7 Claims. (Cl. 74—217)

The invention relates to a variable speed belt drive for operation from a constant speed drive shaft.

An object of the invention is to provide an improved variable speed power drive of the type described wherein the lateral friction of a belt with a pulley may be automatically minimized as the belt is variably engaged along a stepped pulley of the drive structure.

Another object of the invention is to provide for an improved and single means for maintaining the tension in belts which respectively connect a jack shaft with a stepped pulley on a drive shaft and a pulley to be driven.

A further object is to provide a drive of the character described which is particularly adapted for operating a rotary duplicator or a similarly operated mechanism.

The invention possesses other objects and features of advantage, some of which, with the foregoing, will be set forth or be apparent in the following description of a typical embodiment of the invention, and in the accompanying drawing, in which, Figure 1 is an elevation showing an operative application of the present variable speed drive device between the drum of a rotary duplicator and the shaft of an electric motor for operating the duplicator.

Figure 2 is a plan view of the drive mechanism.

Figure 3 is a perspective view of the drive mechanism.

Figure 4 is an enlarged and fragmentary plan view of that portion of the drive device which particularly relates to the mounting and control of a shift fork thereof.

Figure 5 is an enlarged fragmentary section taken at 5—5 in Figure 3.

As particularly illustrated, a variable speed drive embodying the present invention is operatively associated with a duplicating machine 6 which includes a rotary printing cylinder 7 which is supported from a base frame 9; the duplicating machine 6 is shown and described in detail in my copending application Serial Number 749,338 for United States Letters Patent on a Duplicating machine. A belt pulley 8 is mounted on the cylinder 7 at one end thereof for use in effecting a power rotation of the cylinder. A flexible belt 10 extends downwardly from the pulley 8 and through the frame base and the top of a supporting table 11 for driving connections with a constant speed electric motor 12 which is fixedly mounted on a shelf 13 of the table.

To provide for driving the duplicating machine at different speeds, the motor shaft 14 has a stepped and grooved pulley 15 fixedly mounted thereon and engaged by a belt 16 which extends around a single-groove pulley 17 mounted on a jack-shaft 18. The jack-shaft 18 also carries a pulley 19 which is engaged by the belt 10 whereby the duplicating machine may be continuously operated at different speeds from the constant-speed motor 12. Both of the pulleys 15 and 19 are shown as appreciably smaller than the pulley 17 whereby a considerable speed reduction is accomplished between the motor shaft and the duplicator cylinder. The jack-shaft 18 is so mounted that the belts 10 and 16 are arranged to be automatically maintained in tensed condition independently of which groove of the pulley 15 is engaged by the belt 16; as shown, the shaft 18 is carried at the extremity of a structure which comprises hingedly and angularly related arm members 21 and 221.

For purposes of structural rigidity, the members 21 and 22 comprise generally U-shaped frames with the member 21 carrying the shaft 18 journalled in and between the free ends of its sides and pivotally secured at its base end to and between the free ends of the member 22 by means of a pivot pin 23 engaged through both members in coplanar relation thereto. The base end of the member 22 is pivotally connected with a turntable 24 by means of a hinge pin 25 engaging the member and ears 28 extending upwardly from the turntable. Preferably, and as shown, the pulley 17 on the jack-shaft 18 is disposed in the general plane of the arms 21 and 22, said plane being vertical and including the turntable axis, and the pulley 19 is mounted on an extending shaft portion. The axes of the shaft 18 and of the pivot pins 23 and 25 are mutually parallel whereby the pulley 17 is arranged to be constantly disposed in the aforesaid plane of the arms 21 and 22. The turntable 24 is mounted on a base 26 which is fixed on the table shelf 13 in a suitable manner.

A tension spring 27 is operative between the arms 21 and 22 whereby, when the belts 10 and 16 are operative for the driving of the duplicator pulley 8 from the motor pulley 15, a translation of the floating jack-shaft generally toward the axis of the pin 25 is urged for maintaining both belts in tensed and operative condition. The pin 25 is disposed opposite the reflex angle defined by the planes which intersect at the jack-shaft axis and respectively include the motor shaft and cylinder axes, and said pin preferably lies in a plane which generally bisects said reflex angle whereby the components of the pull exerted on the jack-shaft by the spring 27 for urging it toward the pin 25 may be susbtantially equal in the two belts 10 and 16 which jointly determine the positioning of the shaft.

It will now be understood that while a movement of the belt 16 along the stepped pulley 15 will change the required spacing of the jack-shaft from the motor shaft, the disclosed mounting for the jack-shaft automatically permits the newly required spaced relation of the shafts while keeping the belts properly tightened. Furthermore, it will be noted that the present mounting of the pulley 17 on the turntable permits and provides for the constant disposal of the pulley 17 in the plane of the belt 16; in this manner the belt 16 does not tend to ride over the pulley edge, it being further noted that the grooves of the smaller and stepped pulley 15 are deep enough to prevent the escape of the belt thereat despite any slight obliquity of the belt plane to the plane of the pulley groove which it engages.

Means are provided for selectively engaging the belt 16 in different grooves of the stepped pulley 15; as shown, such means comprises a shift fork 31 which spans the upper belt portion adjacent said pulley. The fork 31 is preferably mounted for operative movement in a line which is defined by the points of tangency of said belt portions with the stepped pulley whereby the belt may always be engaged by the fork at substantially the same distance from the pulley; as shown, the fork is provided at the end of an arm member 35 which is arranged for swinging in a plane parallel to the axis of the motor shaft and perpendicular to the turntable axis, and about an axis which is so located that the arc of movement of the fork is substantially in the said line.

As a means for effecting a shifting of the belt 16 along the stepped pulley 15, a rod 34 is journalled in the table 11 in fixed upright position, said rod carrying the arm 35 fixed thereto for the described movement of the arm to operatively engage the shift fork 31 with the belt 16. At its upper end and adjacent the table top, the rod 34 mounts a radial arm 37 for manual engagement to effect a rocking of the rod to shift the fork in the described manner. As particularly known, the arm 37 extends forwardly through a horizontal slot 38 provided in a plate member 39 which is mounted at an opening provided in a vertically disposed table member 41, said slot having notches 42 in its bottom edge for receiving the arm, and said notches corresponding to the different steps of the pulley 15 whereby the setting of the belt 16 may be determined. In the disclosed arrangement, a tension spring 43 is operative between the arm 37 and a table top member for urging a disposal of the shift fork 31 toward the smaller end of the stepped pulley 15, and the notches 42 are appropriately sloped to normally retain the arm 37 in a notch in which it rests.

To facilitate the engagement and disengagement of the arm 37 with respect to the notches 42, the arm portion 45 which extends through the plate 39 may be pivoted at its inner end to the remaining arm portion at a pivot pin 46 for a displacement of the portion 45 from its notch-engaging position solely in a plane which includes the axis of the rod 34. The arm portion 45 carries a knob 47 at its free end to further facilitate its manual manipulation.

An arm 32 extends radially from the turntable 24 in the plane of the pulley 17 and toward the shift fork 31, and a link 36 connects the arm 32 with the arm 35 whereby a swinging of the arm 35 to shift the belt along the motor pulley 15 is positively operative to maintain the pulley 17 in the plane of the belt 16 independently of the described action of the spring 17 to urge the same relation. It will be particularly noted that the relation of the interconnected parts is such that the shift fork 31 is arranged to be always operative against the belt in the plane of the belt for all positions of the belt on the pulley 15. The space between the fork prongs is preferably somewhat greater than the belt width whereby the fork is arranged to contact the belt only during a shifting of the latter.

From the foregoing description taken in connection with the accompanying drawing, the advantages of the construction and method of operation will be readily understood by those skilled in the art to which the invention appertains. While I have described the features and method of use of a device which I now consider to be a preferred embodiment of my invention, I desire to have it understood that the showing is primarily illustrative, and that such changes may be made, when desired, as fall within the scope of the following claims,

I claim:

1. In a variable speed drive of the character described, the combination of a drive shaft fixed against an axial shifting thereof and having a stepped pulley fixedly mounted thereon and providing a series of belt grooves of different diameter, a driven pulley, a belt extending around said driven pulley and engaged in a groove of the stepped pulley, and means mounting said driven pulley for its movement axially thereof and about an axis lying in the plane of the pulley and angularly related to the axis of rotation of the driven pulley whereby the pulley is arranged to be and remain in the plane of the belt when the belt is engaged in different grooves of the stepped pulley.

2. A structure in accordance with claim 1 characterized by the provision of spring means constantly operative to urge a coplanar disposition of the belt and driven pulley.

3. In a variable speed drive of the character described, the combination of a drive shaft having a stepped pulley fixed thereon and providing a series of belt grooves of different diameters, a driven pulley, a belt extending around said driven pulley and engaged in a groove of the stepped pulley, means supporting the driven pulley and constantly operative to tense said belt between said pulleys, a turntable carrying said means for the rotation of the driven pulley about an axis in the plane of the pulley to permit the disposal of the pulley in the plane of the belt while the belt engages the different grooves of the stepped pulley, a shift fork spanning said belt at a point thereof adjacent said stepped pulley and operative for adjusting the belt along said pulley, and means connecting said shift fork with the turntable in such manner that said fork is arranged to be constantly operative in the plane of the driven pulley.

4. In a variable speed drive of the character described, the combination of a drive shaft having a stepped pulley fixed thereon and providing a series of belt grooves of different diameters, a driven pulley, a belt operatively extending between said driven pulley and a selected groove of the stepped pulley, means supporting the driven pulley and constantly operative to tense said belt between said pulleys, a turntable carrying said means for permitting the constant disposal of the driven pulley in the plane of the belt, a shift fork for engaging the belt at a point thereof adjacent said stepped pulley, and an arm supporting said shift fork for its adjusted disposal in a line which is oblique to the plane of said belt and is substantially parallel to a line through the points of tangency of the operative belt with the pulley.

5. A structure in accordance with claim 4 characterized by the provision of a shift rod mounting the fork-supporting arm for its swinging about a fixed axis which is parallel to the turntable axis, and means connecting said turntable to the arm in such manner that the driven pulley is arranged to be automatically retained in the plane of the belt as the belt is shifted along the stepped drive pulley by means of the shift fork.

6. In a variable speed drive of the character described, the combination of a drive shaft having a stepped pulley fixedly mounted thereon and providing a series of belt grooves of different diameter, a driven pulley, a belt extending around said driven pulley and engaged in a groove of the stepped pulley, means mounting said driven pulley for its movement axially thereof and also about an axis constantly lying in the plane of the pulley and perpendicular to the axis of rotation of the driven pulley whereby the pulley is arranged to be and remain in the plane of the belt when the belt is engaged in different grooves of the stepped pulley, and a shift fork movable against the belt for adjusting the belt along the stepped pulley.

7. In a variable speed drive of the character described, the combination of a drive shaft fixed against an axial shifting thereof and having a stepped pulley fixedly mounted thereon and providing a succession of belt grooves, a driven pulley, a belt extending around said driven pulley and engaged in a groove of the stepped pulley, and means mounting said driven pulley for free pivotal movement thereof about an axis in its plane whereby said pulley is arranged to be and remain in the plane of the belt when the belt engages different grooves of the stepped pulley.

FERDINAND NIGRA.

CERTIFICATE OF CORRECTION.

Patent No. 2,106,930.   February 1, 1938.

FERDINAND NIGRA.

It is hereby certified that the name of the assignee in the above numbered patent was erroneously described and specified as "Nigra Duplicator Company" whereas said name should have been described and specified as Niagara Duplicator Company, of San Francisco, California, a corporation of California, as shown by the record of assignments in this office; and that the said Letters Patent should be read with this correction therein that the same may conform to the record of the case in the Patent Office.

Signed and sealed this 11th day of October, A. D. 1938.

Henry Van Arsdale (Seal)   Acting Commissioner of Patents.